United States Patent
Rapp et al.

(10) Patent No.: US 11,511,689 B2
(45) Date of Patent: Nov. 29, 2022

(54) SUPPLEMENTARY POWER SUPPLY AND A METHOD FOR PROVIDING SUPPLEMENTAL POWER

(71) Applicant: KNORR-BREMSE Systeme fuer Nutzfahrzeuge GmbH, Munich (DE)

(72) Inventors: Tamas Rapp, Budapest (HU); Falk Hecker, Markgroeningen (DE); Huba Nemeth, Budapest (HU); Benedek Pour, Budapest (HU)

(73) Assignee: KNORR-BREMSE Systeme fuer Nutzfahrzeuge GmbH, Meunchen (DE)

( * ) Notice: Subject to any disclaimer, the term of this patent is extended or adjusted under 35 U.S.C. 154(b) by 0 days.

(21) Appl. No.: 17/276,220

(22) PCT Filed: Aug. 27, 2019

(86) PCT No.: PCT/EP2019/072784
§ 371 (c)(1),
(2) Date: Mar. 15, 2021

(87) PCT Pub. No.: WO2020/057904
PCT Pub. Date: Mar. 26, 2020

(65) Prior Publication Data
US 2022/0024397 A1  Jan. 27, 2022

(30) Foreign Application Priority Data
Sep. 17, 2018  (EP) .................................. 18194821

(51) Int. Cl.
*B60R 16/033* (2006.01)
*H02J 9/06* (2006.01)

(52) U.S. Cl.
CPC .............. *B60R 16/033* (2013.01); *H02J 9/06* (2013.01)

(58) Field of Classification Search
CPC .................................. B60R 16/033; H02J 9/06
USPC ..................................................... 307/9.1, 10.1
See application file for complete search history.

(56) References Cited

U.S. PATENT DOCUMENTS

| 11,198,405 B2* | 12/2021 | Shimamoto ........... B60R 16/033 |
| 2002/0084786 A1 | 7/2002 | Egami |
| 2006/0145536 A1 | 7/2006 | Hackl et al. |
| 2010/0243388 A1 | 9/2010 | Holzwarth |

(Continued)

FOREIGN PATENT DOCUMENTS

| DE | 10 2006 010 713 A1 | 9/2007 |
| DE | 10 2007 021 286 A1 | 11/2008 |

(Continued)

OTHER PUBLICATIONS

International Search Report (PCT/ISA/210) issued in PCT Application No. PCT/EP2019/072784 dated Dec. 12, 2019 (three (3) pages).

(Continued)

*Primary Examiner* — Michael R. Fin
(74) *Attorney, Agent, or Firm* — Crowell & Moring LLP

(57) ABSTRACT

A supplementary power supply for a vehicle that includes a main power supply is disclosed. The supplementary power supply includes at least one supplementary power unit dedicated as backup power supply for safety relevant components such as controllers and/or actuators.

6 Claims, 1 Drawing Sheet

(56) References Cited

U.S. PATENT DOCUMENTS

| | | | | |
|---|---|---|---|---|
| 2011/0204720 | A1* | 8/2011 | Ruiz | B60L 58/21 |
| | | | | 307/66 |
| 2011/0316329 | A1 | 12/2011 | Nishino et al. | |
| 2014/0265559 | A1 | 9/2014 | Leehey et al. | |
| 2018/0334118 | A1* | 11/2018 | Masui | H02J 7/0014 |
| 2019/0184922 | A1 | 6/2019 | Tazarine et al. | |
| 2019/0312449 | A1* | 10/2019 | Matsushita | H02J 1/08 |
| 2020/0313457 | A1* | 10/2020 | Kozuki | H02J 7/0047 |

FOREIGN PATENT DOCUMENTS

| | | |
|---|---|---|
| EP | 1 302 371 A2 | 4/2003 |
| EP | 2 824 007 A1 | 1/2015 |
| EP | 3 254 883 A1 | 12/2017 |
| GB | 2553655 A | 3/2018 |
| JP | 2002-200948 A | 7/2002 |
| JP | 2007-22196 A | 2/2007 |
| JP | 2010-195111 A | 9/2010 |
| JP | 2014-213706 A | 11/2014 |
| JP | 2016-516389 A | 6/2016 |
| JP | 2018-111391 A | 7/2018 |
| WO | WO 2004/070911 A1 | 8/2004 |
| WO | WO 2009/125265 A2 | 10/2009 |
| WO | WO 2018/036670 A1 | 3/2018 |

OTHER PUBLICATIONS

Written Opinion (PCT/ISA/237) issued in PCT Application No. PCT/EP2019/072784 dated Dec. 12, 2019 (six (6) pages).
Extended European Search Report issued in European Application No. 18194821.7 dated Apr. 8, 2019 (seven (7) pages).
Japanese-language Office Action issued in Japanese Application No. 2021-514523 dated Apr. 20, 2022 with English translation (eight (8) pages).

* cited by examiner

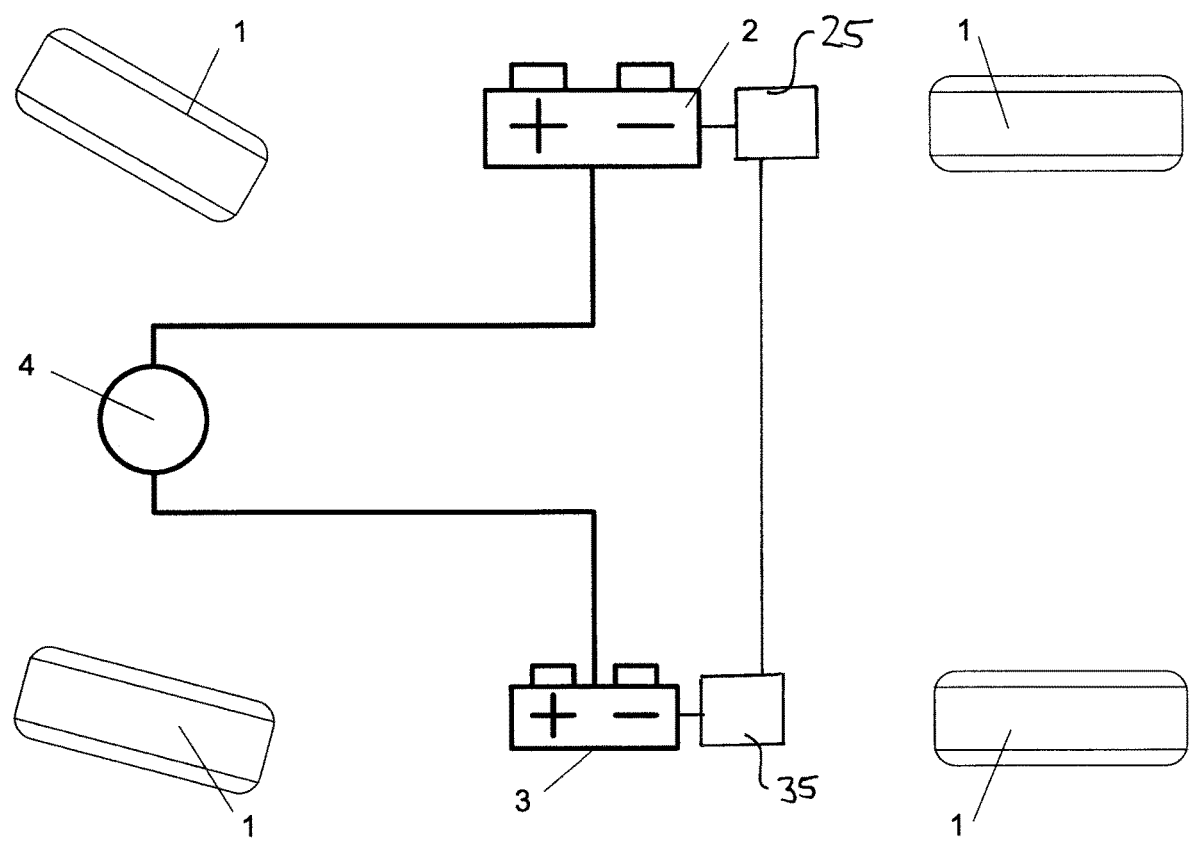

SUPPLEMENTARY POWER SUPPLY AND A METHOD FOR PROVIDING SUPPLEMENTAL POWER

BACKGROUND AND SUMMARY OF THE INVENTION

The present invention relates to a supplementary power supply, a redundant vehicle power supply system, a method for supplying supplementary power and, in particular, to an asymmetric redundant electric power supply architecture.

The electrification in the automotive sector has triggered replacements of several vehicle components resulting in novel architectures. For example, many components of commercial vehicles used to rely on compressed air as energy source for control and actuation purposes. A redundant power supply system based on compressed air was implemented for several safety relevant components. Due to the electrification many of these pneumatic components are to be replaced by electrically powered components. In addition, automated driving applications set new requirements for the vehicle systems and, in particular, for safety relevant units.

A conventional system is disclosed in DE 10 2006 010 713 A1, wherein a safety-relevant consumer is electrically connected with a primary system and a secondary system. The consumer is redundantly supplied with power by the primary and secondary systems, which are decoupled from one another. Another conventional system is disclosed in DE 10 2007 021 286 A1, wherein an electromechanical braking system and an associated method with a fail-safe power supply is described.

However, there is a demand for further redundant power supply architectures for ensuring controlling and actuating safety of relevant components in a vehicle.

At least some of these problems are solved by a supplementary power supply, a redundant power supply system, and a method, according to the independent claims. The dependent claims refer to specifically advantageous realizations of the subject matter of the independent claims.

Embodiments of the present invention relate to a supplementary (or secondary) power supply for a vehicle that includes a main power supply. The supplementary power supply includes at least one supplementary power unit dedicated as backup power supply for at least one safety relevant vehicle component, in particular for one or more controllers and/or one or more actuators.

Under normal operation the main power supply can provide power to the safety relevant component(s). But if the main power supply exhibits a failure, the supplementary power supply can be engaged to provide the backup power. The supplementary power supply may not supply power as long as the main power supply operates correctly. In addition, the supplementary power supply may be dedicated to specific safety relevant components. It may not be a general redundant power supply for the main power supply to provide additional power to all vehicle components. It is understood that the main power supply may provide its own application independent redundancy.

The safety relevant components that shall be protected by embodiments of the present invention are, in particular, those components (e.g. control units, actuators, sensors etc.) that represent an immediate threat for people and/or the load in case of its failure. A failure of the main power supply does not mean necessarily an error or malfunctioning. The term "failure" refers likewise to the situation, where the main power supply is insufficient or (almost) empty and needs to be recharged. In this case, too, a correct functioning of the vehicle components cannot be ensured by the main power supply.

To further increase the safety level, the supplementary power may include a management unit for monitoring and managing the supplementary power unit. Optionally, the management unit is configured to provide load information (e.g. to the driver) indicating a remaining capacity for performing maneuvers.

Optionally, the at least one supplementary power unit includes different, dedicated electrical energy storage units to provide, in case of a failure of the main power supply, independent power for specific one or more safety relevant components.

Optionally, the at least one supplementary power unit comprises a lower electric capacity compared to an electrical storage capacity of the main power supply. Thus, embodiments relate, in particular, to an asymmetric power supply. The capacity of the supplementary power supply may be adjusted to the particular safety relevant component.

Optionally, the safety relevant component(s) such as one or more controllers or actuators are part of at least one of the following units: a steering unit, a braking unit, an electronic control unit of the vehicle, a light unit, a sensor unit.

Further embodiments relate to a redundant electric power supply system for a vehicle. The system includes a main power supply for providing electric power for operating the vehicle, and a supplementary power supply as defined before to provide backup power for at least one safety relevant vehicle component. The main power supply is adapted to provide power for the safety relevant vehicle component as well as to other vehicle components. On the other hand, the supplementary power supply may be adapted to provide only backup power for the safety relevant vehicle component in case of a failure in the main power supply.

Optionally, the redundant power supply system includes a management unit for the main power supply for monitoring and controlling the main power supply and to provide information indicating a load status of the main power supply (e.g. to the driver).

Further embodiments relate to a vehicle, in particular a commercial vehicle, with a redundant electric power supply system as defined before.

Yet another embodiment relates to a method for providing supplemental power supply for a vehicle with a main power supply. The method comprises the steps of:
  detecting a failure in the main power supply (e.g. by one of the management units);
  providing supplemental power for safety relevant components (e.g. controllers and/or actuators) from at least one supplementary power supply unit dedicated as backup power supply.

This method or part thereof may also be implemented in or caused by software or a computer program product. Embodiments of the present invention can, in particular, be implemented by software or a software module in an ECU of the vehicle. Therefore, embodiment relate also to a computer program having a program code for performing the method, when the computer program is executed on a processor.

A particular advantage of embodiments of the present invention is the ability to ensure a redundant power supply for a system relying on a primary main power supply by an additional, independent power supply (supplemental power supply) dedicated for safety relevant consumers/applications/components. These include, inter alia, applications or controllers or actuators for several units that are essential for the vehicle security (e.g. relating to braking, steering, sensing the surrounding etc.).

Some examples of the systems and/or methods will be described in the following by way of examples only, and with respect to the accompanying figure.

BRIEF DESCRIPTION OF THE DRAWING

FIG. 1 depicts an electric power supply architecture according to an embodiment of the present invention.

DETAILED DESCRIPTION OF THE DRAWING

FIG. 1 depicts an electric power supply architecture according to an embodiment of the present invention. The supply architecture comprises a main power supply 2 and a supplementary power supply 3, wherein both power supplies are independent of each other. In addition, the vehicle comprises particular safety relevant components 4 such as controllers, actuators, sensors or other applications needed for safety relevant applications. These safety relevant components have, according to embodiments of the present invention, a separate backup system implemented by the supplementary power supply 3.

The main power supply 2 is, for example, intended for the normal operation of the vehicle (in the absence of any failure), whereas the supplemental power supply 3 provides backup power for the safety relevant vehicle components or applications 4 such as steering, braking or any other actuation. The steering of the vehicle wheels 1, for example, is powered during normal operation by the main power supply 2. However, if a failure in the main power supply 2 occurs, the supplemental power supply 3 is used as backup power.

This supplementary power supply 3 may be dedicated for one or more specific safety relevant component 4 (controller and/or actuator). Therefore, according to further embodiments additional supplemental power supplies are provided for various safety relevant components. It is even possible that each safety relevant component has its own supplementary power supply.

The power supply system may include a management unit 35 for the supplementary power supply 3 and a management unit 25 for the main power supply 2. The management unit 35 of the supplementary power supply 3 is able to monitor the supplementary power unit 3 and based thereon to provide load information. The management unit 25 for the main power supply 2 is likewise able to monitor and control the main power supply 2. Both management units 25, 35 can communicate with each other to exchange information, e.g. about failures.

If a failure in the main power supply 2 is detected or if the main power supply 2 is not able to provide sufficient energy for maintaining all functions, a corresponding signal will be issued, e.g. by the management unit 25 of the main power supply 2 and forwarded to the management unit 35 of the supplemental power supply 3. In response thereto, the supplemental power supply 3 will provide backup power to the safety relevant component 4 to ensure correct operations of this component.

According to further embodiments, the supplementary power supply 3 is continuously monitored in order to ensure that sufficient power is always available. In contrast hereto, the main power supply 2 does not necessarily need to be monitored continuously. The monitoring of the supplementary power supply 3 may involve a prediction for the capability of performing a certain number of maneuvers (brake actions, steering actions, and so on). If the monitoring reveals that there is not sufficient power to maintain a particular minimum number of actuations, a respective message may be submitted to the driver.

Since the safety relevant controllers and actuators 4 need the supplementary power supply 3 only as a backup system and since these components 4 may need less energy (e.g. sensors do not need much energy), the capacity of the supplementary power supply 3 can be lower than the capacity of the main power supply 2. Hence, the vehicle power supply is asymmetric: a large main power supply 2 is combined with one or more small supplementary power supplies 3 for safety relevant components 4, whose capacity may be less than half or less than one tenth of the capacity of the main power supply 2.

Advantages of embodiments relate in particular to the following aspects:
  a redundant power supply architecture which can be applied in particular to safety relevant consumers 4 such as the steering/braking system is provided.
  The standard board network 2 (main power supply) of the vehicle is used as a primary power supply circuit and the supplementary power supply 3 is dedicated to be applied as a backup system. An asymmetric power supply is made possible.
  The supplementary power supply 3 comprises dedicated electric energy storage units that are separated and isolated from the main power supply 2.
  The condition of the main power supply 2 does not necessarily need to be monitored continuously. However, it may be monitored for further improving the safety of the vehicle.

Further advantageous embodiments relate to the following subject matters:
  A redundant electric power supply architecture, wherein the main vehicle power circuit is used as a primary circuit and an additional circuit used as a second circuit for safety relevant controller(s) and/or actuator(s);
  The defined redundant electric power supply architecture, wherein the second circuit is monitored to be able to provide a prediction of the remaining manoeuvre capability;
  The defined redundant electric power supply architecture, wherein the first circuit is also monitored to improve safety;
  The defined redundant electric power supply architecture, wherein the second circuit has a dedicated electrical energy storage unit (battery, supercapacitor, etc.);
  The defined redundant electric power supply architecture, wherein the second circuit has an electrical energy storage unit with lower capacity compared to the primary (main) electrical energy storage unit;
  The defined redundant electric power supply architecture, wherein the described power supply architecture can supply safety relevant control and/or actuator units of the vehicle (e.g. steering and or brake actuation, control ECUs, lights, etc.)

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

LIST OF REFERENCE SIGNS 1 vehicle wheels
2 main power supply
3 supplementary power supply
4 safety relevant controller(s) and/or actuator(s)
25 management unit for the main power supply
35 management unit for the supplementary power supply

The invention claimed is:

1. A redundant electric power supply system for a vehicle, comprising:
   a main power supply for providing electric power for operating the vehicle;
   a supplementary power supply including at least one supplementary power unit dedicated as a backup power supply for at least one safety relevant vehicle component;
   a management unit for the main power supply configured to monitor the main power supply and to provide information indicating a load status of the main power supply; and
   a management unit of the supplementary power supply for monitoring the supplementary power unit,
   wherein
      the main power supply is adapted to provide power for the at least one safety relevant vehicle component and other vehicle components,
      the supplementary power supply is adapted to provide backup power only for the safety relevant vehicle component in case of a failure in the main power supply,
      the management unit of the main power supply is configured to issue a signal if the main power supply is not able to provide sufficient energy for maintaining all functions,
      the management unit of the supplementary power supply is configured to provide load information indicating a remaining capacity for performing maneuvers by the vehicle, including a prediction for a capability of performing a certain number of maneuvers,
      both management units are adapted to communicate with each other to exchange information about the failure, and
      the management unit of the supplementary power supply is configured to, in response to receipt of the signal of the management unit for the main power supply, provide backup power to the safety relevant component.

2. A commercial vehicle, comprising a redundant electric power supply system according to claim 1.

3. The supplementary power supply according to claim 1, wherein
   the at least one supplementary power unit includes different, dedicated electrical energy storage units to provide independent power for safety relevant controllers and/or actuators in case of a failure of the main power supply.

4. The supplementary power supply according to claim 1, wherein
   the at least one supplementary power unit has a lower electric capacity compared to an electrical storage capacity of the main power supply.

5. A method for providing supplemental power for a vehicle with a main power supply for providing electric power for operating the vehicle and with a supplementary power supply including at least one supplementary power unit dedicated to at least one safety relevant vehicle component, comprising:
   providing, by the main power supply, power for the at least one safety relevant vehicle component and other vehicle components;
   monitoring with a management unit for the main power supply a load status of the main power supply, the management unit being configured to issue a signal in the event of a failure of the main power supply or if the main power supply is not able to provide sufficient energy for maintaining all functions;
   determining with a management unit of the supplementary power supply a load information indicating a remaining capacity of the supplementary power supply for performing maneuvers by the vehicle;
   in the event of the failure in the main power supply or if the main power supply is not able to provide sufficient energy for maintaining all functions, forwarding the signal to the management unit of the supplementary power supply;
   providing, in response to the signal from the main power supply, backup power by the supplementary power supply only for the at least one safety relevant vehicle component;
   communicating of both management units with each other to exchange information about the failure; and
   if the remaining capacity of the supplementary power supply is below a predetermined remaining capacity, issuing a supplementary power supply remaining status signal from the management unit of the supplementary power supply to a driver of the vehicle.

6. The supplementary power supply according to claim 3, wherein
   the safety relevant controllers and/or actuators are part of at least one of the following vehicle units: a steering unit, a braking unit, an electronic control unit of the vehicle, a light unit, or a sensor unit.

* * * * *